(12) United States Patent
Farkash et al.

(10) Patent No.: US 11,240,044 B2
(45) Date of Patent: Feb. 1, 2022

(54) VERIFYING PURPOSE OF DATA USAGE AT SUB-APPLICATION GRANULARITY

(71) Applicant: International Business Machines Corporation, Armonk, NY (US)

(72) Inventors: Ariel Farkash, Shimshit (IL); Abigail Goldsteen, Haifa (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 16/198,819

(22) Filed: Nov. 22, 2018

(65) Prior Publication Data

US 2020/0169421 A1    May 28, 2020

(51) Int. Cl.
*H04L 9/32* (2006.01)
*G06F 21/60* (2013.01)

(52) U.S. Cl.
CPC .......... *H04L 9/3268* (2013.01); *G06F 21/602* (2013.01)

(58) Field of Classification Search
CPC ... G06F 21/602; G06F 21/629; H04L 9/3268; H04L 9/3247; H04L 63/062; H04L 63/0823; H04L 63/101; H04L 63/126
USPC ........................................................ 713/189
See application file for complete search history.

(56) References Cited

U.S. PATENT DOCUMENTS

| | | |
|---|---|---|
| 7,243,236 B1 | 7/2007 | Sibert |
| 7,673,331 B2 * | 3/2010 | Kido .................... H04L 63/062 726/7 |
| 7,992,135 B1 | 8/2011 | Wong et al. |
| 8,745,616 B1 | 6/2014 | Deacon |
| 8,931,106 B2 | 1/2015 | Maher et al. |
| 9,667,414 B1 * | 5/2017 | Brandwine ........... H04L 9/0819 |
| 10,152,761 B2 * | 12/2018 | Kress ..................... G06Q 10/10 |
| 2005/0262086 A1 | 11/2005 | Ta et al. |
| 2006/0010319 A1 * | 1/2006 | Bonnet ................... G06F 9/468 713/164 |

(Continued)

OTHER PUBLICATIONS

M. Anisetti et al., "A Certification Framework for Cloud-based Services", Proceedings of the 31st Annual ACM Symposium on Applied Computing, 2016, pp. 440-447.

*Primary Examiner* — Samson B Lemma
(74) *Attorney, Agent, or Firm* — Gregory J Kirsch (57) ABSTRACT

Embodiments of the present systems and methods may provide techniques for verifying the correct application purpose for applications that serve multiple purposes and to determine the correct purpose for each requested data access. For example, in an embodiment, a method for controlling application access to data implemented in a computer comprising a processor, memory accessible by the processor, and computer program instructions stored in the memory and executable by the processor may comprise: receiving an application comprising a plurality of application parts, each application part associated with a declared data access purpose and generating a cryptographic certificate for each application part to be certified by determining whether a declared data access purpose for each application part to be certified is correct and the only data access purpose for that part, wherein the declared purpose is included in purpose information associated with each application part to be certified.

20 Claims, 7 Drawing Sheets

(56) References Cited

U.S. PATENT DOCUMENTS

| | | | |
|---|---|---|---|
| 2007/0226798 A1* | 9/2007 | Sibert | H04L 9/3271 |
| | | | 726/22 |
| 2010/0223672 A1* | 9/2010 | Maher | G06Q 30/02 |
| | | | 726/26 |
| 2015/0143456 A1* | 5/2015 | Raleigh | H04W 12/088 |
| | | | 726/1 |
| 2015/0294092 A1 | 10/2015 | Balasubramanian | |
| 2018/0007037 A1* | 1/2018 | Reese | H04L 9/3297 |
| 2018/0091497 A1* | 3/2018 | Nadler | H04L 63/10 |
| 2018/0364988 A1* | 12/2018 | Horowitz | G06F 21/629 |

* cited by examiner

```
Subject: C=US,ST=California,L=San Francisco,
O=Wikimedia Foundation,Inc., CN=*.wikipedia.org

Subject Public Key Info:
Public Key Algorithm: id-ecPublicKey
Public-Key: (256bit)
pub: 04:c9:22:69:31:8a:d6:6c:ea:da:c3:7f:2c:ac:a5:
af:c0:02:ea:81:cb:6S:b9:fd:0c:6d:46:Sb:c9:1e:
ed:b2:ac:2a:1b:4a:ec:B0:7b:e7:1a:Sl:e0:df:f7:
c7:4a:20:7b:91:4b:20:07:21:ce:cf:6B:65:8c:c6:
9d:3b:ef:d5:cl
ASN1 OID: prime256v1
NIST CURVE: P-256

X509v3 Subject Alternative Name:
Application: DNS=*.wikipedia.org, P=Information sharing
Application: DNS=*.m.mediawiki.org,P= Publish Code...
```

VERIFYING PURPOSE OF DATA USAGE AT SUB-APPLICATION GRANULARITY

BACKGROUND

The present invention relates to techniques for verifying the correct application purpose for applications that serve multiple purposes and to determine the correct purpose for each requested data access.

Different privacy regulations, such as the General Data Protection Regulation (GDPR), mandate that users' personal data may be processed by applications/services only for the declared purpose for which the data was collected and that was consented to by the user. Users may consent to their data being used for some purposes, and deny it for other purposes. Tools such as Data Policy and Consent Manager can be used by applications to request access to personal data based on the purpose for which the data will be used, and receive an access decision accordingly.

To verify the application's actual purpose, a process called application purpose certification is in place, whereby a trusted authority certifies the application for one or more purposes and issues it a purpose certificate, which can be verified at runtime. However existing solutions only enable purpose verification at the application level, and do not solve the issue of applications that serve multiple purposes and the challenge of determining what is the correct purpose for each requested data access Accordingly, a need arises for techniques that provide the capability to verify the correct application purpose for applications that serve multiple purposes and to determine the correct purpose for each requested data access.

SUMMARY

Embodiments of the present systems and methods may provide techniques for verifying the correct application purpose for applications that serve multiple purposes and to determine the correct purpose for each requested data access. Embodiments may provide the capability to certify different parts of an application for different purposes and to validate the correct purpose of a data access request. This enables finer grained access control based on the real purpose of the data access. Embodiments may verify that the correct purpose is used by applications at a finer granularity than the application level. Embodiments may support allowing or denying data accesses based on which part of the application is performing the data access, to ensure compliance with the relevant regulations at a finer granularity.

For example, in an embodiment, a method for controlling application access to data implemented in a computer comprising a processor, memory accessible by the processor, and computer program instructions stored in the memory and executable by the processor may comprise: receiving an application comprising a plurality of application parts, each application part associated with a declared data access purpose and generating a cryptographic certificate for each application part to be certified by determining whether a declared data access purpose for each application part to be certified is correct and the only data access purpose for that part, wherein the declared purpose is included in purpose information associated with each application part to be certified.

In embodiments, the application parts may comprise at least one of an area, module, section, portion, function, address, uniform resource locator (URL), or control flow of an application. The method may further comprise generating a hash of program application code of each application part to be certified and signing the generated hash and signing data access purpose with a private cryptographic key to form the cryptographic certificate. The method may further comprise installing the received program application code by: verifying a cryptographic certificate for each application part to be installed and installing the verified application parts. Verifying the cryptographic certificate may comprise generating a hash of program application code of each application part to be installed, opening the cryptographic certificate using a public key to obtain the corresponding hash of each application part to be installed, comparing the generated hash with the corresponding hash, and when the generated hash matches the corresponding hash, installing that application part along with signed purpose information associated with that application part. The method may further comprise receiving an application wherein each of a plurality of application parts has been certified with a data usage purpose, executing the program application code, and when a certified application part requests access to data, determining whether to allow access to the requested data based on the certified data usage purpose and on the identity of the application part. Determining whether to allow access to the requested data may comprise sending a request for data from an application part and associated signed purpose information, receiving a response to the request for data generated by: retrieving data responsive to the request for data and possibly information indicating a subject of the retrieved data, retrieving the requested purpose from the signed purpose information, determining whether the retrieved data is allowed for the requested purpose, and including the retrieved data responsive to the request in the response to the request when the retrieved data is allowed for the requested purpose.

In an embodiment, a system for controlling application access to data may comprise a processor, memory accessible by the processor, and computer program instructions stored in the memory and executable by the processor to perform: receiving an application comprising a plurality of application parts, each application part associated with a declared data access purpose and generating a cryptographic certificate for each application part to be certified by determining whether a declared data access purpose for each application part to be certified is correct and the only data access purpose for that part, wherein the declared purpose is included in purpose information associated with each application part to be certified.

In an embodiment, a computer program product for controlling application access to data may comprise a non-transitory computer readable storage having program instructions embodied therewith, the program instructions executable by a computer, to cause the computer to perform a method comprising receiving an application comprising a plurality of application parts, each application part associated with a declared data access purpose and generating a cryptographic certificate for each application part to be certified by determining whether a declared data access purpose for each application part to be certified is correct and the only data access purpose for that part, wherein the declared purpose is included in purpose information associated with each application part to be certified.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques for verifying the correct application purpose for applications that serve multiple purposes and to determine the correct purpose for each requested data access. Embodiments may provide the capability to certify different parts of an application for different purposes and to validate the correct purpose of a data access request. This enables finer grained access control based on the real purpose of the data access. Embodiments may verify that the correct purpose is used by applications at a finer granularity than the application level. Embodiments may support allowing or denying data accesses based on which part of the application is performing the data access, to ensure compliance with the relevant regulations at a finer granularity.

Embodiments may separately certify different parts of an application for different purposes. For example, for a web application, this could be done according to URL; for a native application this could be done per module, function or even a specific control flow within the application code. Each such part may be certified separately, a purpose certificate issued for it and attached to it while the application is bundled and installed. At runtime, the correct purpose may be chosen based on the module/function/URL from which the access request came. This may enable allowing access to data by only specific parts of an application while denying access to other parts, thus increasing the accuracy of the access control decision and preventing purpose fraud. As a result it is also possible to revoke certification (and thus access rights) to specific parts of an application without affecting other parts which fulfill different purposes.

Figure 1:
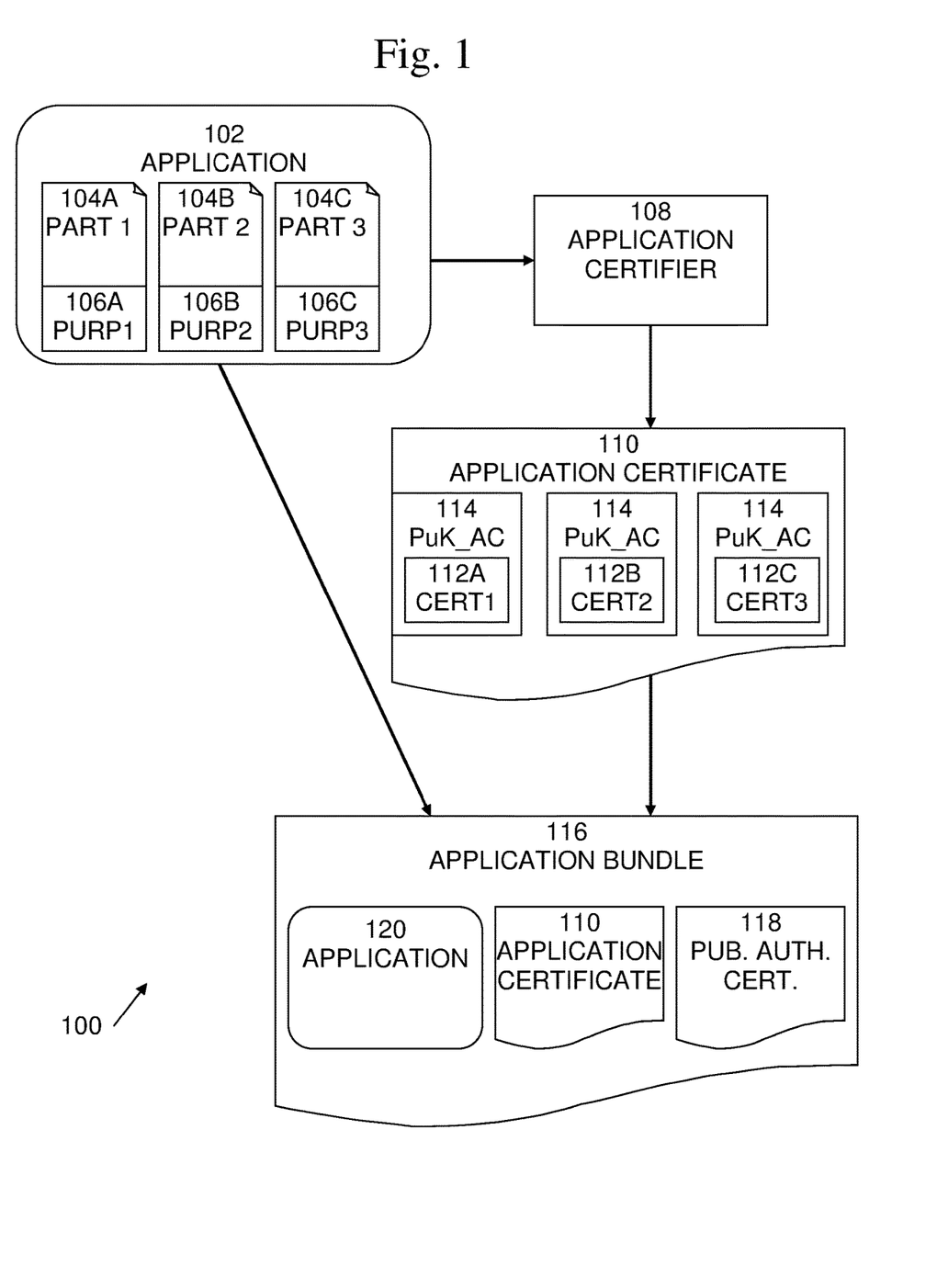
FIG. 1 illustrates an exemplary data flow diagram of an application part certification process according to embodiments of the present systems and methods.

An exemplary data flow diagram of application part certification 100 is shown in FIG. 1. In this example, an application 102 may include a plurality of parts 104A-C, with each part accessing data for one or more purposes 106A-C. In embodiments, each part may access data for only one purposed. Although parts are referred to in this description, embodiments of the present systems and methods are applicable to any area, module, section, portion, function, address, uniform resource locator (URL), control flow, etc., of an application that has a different data usage purpose 106A-C, and for each part a (single) declared usage purpose 106A-C. Application 102 may be provided to application certifier 108 by a publisher. The publisher may be the person or organization that wrote application 102, or the publisher may be a person or organization that provided the code writing tools, a separate publishing service provider, etc.

Application certifier 108 may examine the code and documentation of application 102 using, for example, different means, such as automatic and manual examination, and may determine whether the declared purpose for each part is indeed correct and the only purpose each part fulfills. If the declared purpose is correct, application certifier 108 may create a digital application certificate 110 including a digital certificate 112A-C for each part of application 102. Each digital certificate 112A-C may include a hash of the software code of the application part 104A-C and may include the purpose information 106A-C, signed with the private key 114 of application certifier 108. Application certificate 110 may be bundled together with application 102 to form an application bundle 116, which may include application 120, which may include signed purposes (described below) and application certificate 110 and may also include publisher authentication certificate 118 (described below).

Figure 2:
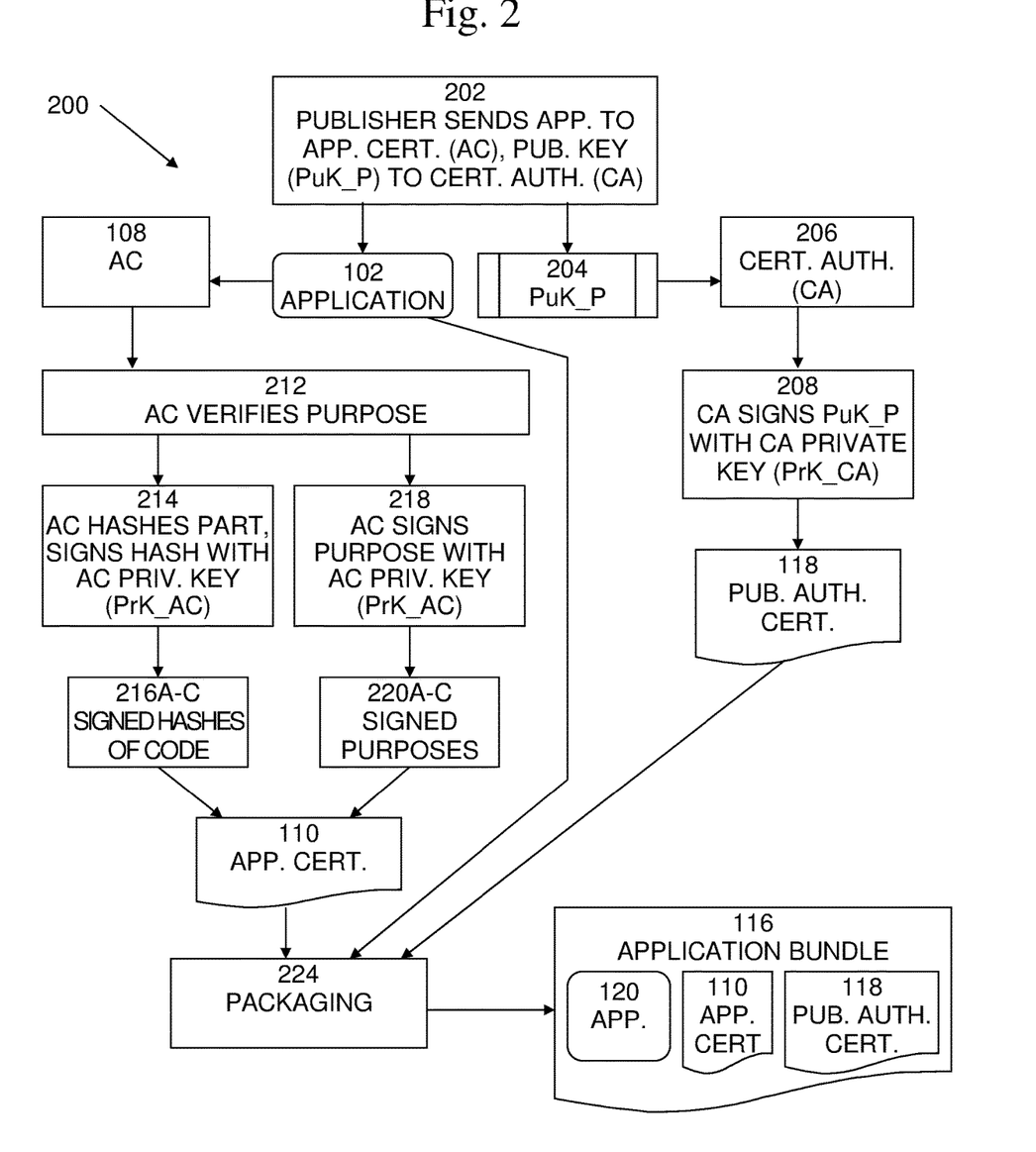
FIG. 2 illustrates an exemplary data flow diagram of application part certification process according to embodiments of the present systems and methods.

An exemplary data flow diagram of an application part certification process 200 that may be performed by application certifier 108 is shown in FIG. 2. It is best viewed in conjunction with FIG. 1. Process 200 begins with 202, in which the publisher of application 102 may send application 102 to application certifier (AC) 108 and may send the publisher's public key (PuK_P) 204 to certificate authority 206. At 208, CA 206 may sign PuK_P 204 with a private key of CA 206 to generate a publisher authentication certificate 118.

Application 102 may include a plurality of parts 104A-C, with each part accessing data for one or more purposes 106A-C. At 212, AC 108 may verify that each purpose 106A-C of each part 104A-C is a correct and permissible purpose for that part. At 214, AC 108 may generate a hash of each application part 104A-C, then may sign each hash with the private key (PrK_AC) of AC 108 to form signed hashes 216A-C, which may include a signed hash corresponding to each part 104A-C of the code of application 102. At 218, AC 108 may sign each purpose 106A-C with the private key (PrK_AC) of AC 108 to form signed purposes 220A-C, which may include a signed purpose corresponding to each purpose 106A-C of application 102. At 222, the signed hashes 216A-C and the signed purposes 220A-C may be combined to form application certificate 222. At 224, application certificate 110, which may include signed purposes 220A-C, application 120, and publisher authentication certificate 118 may be packaged to form application bundle 116.

Figure 3:
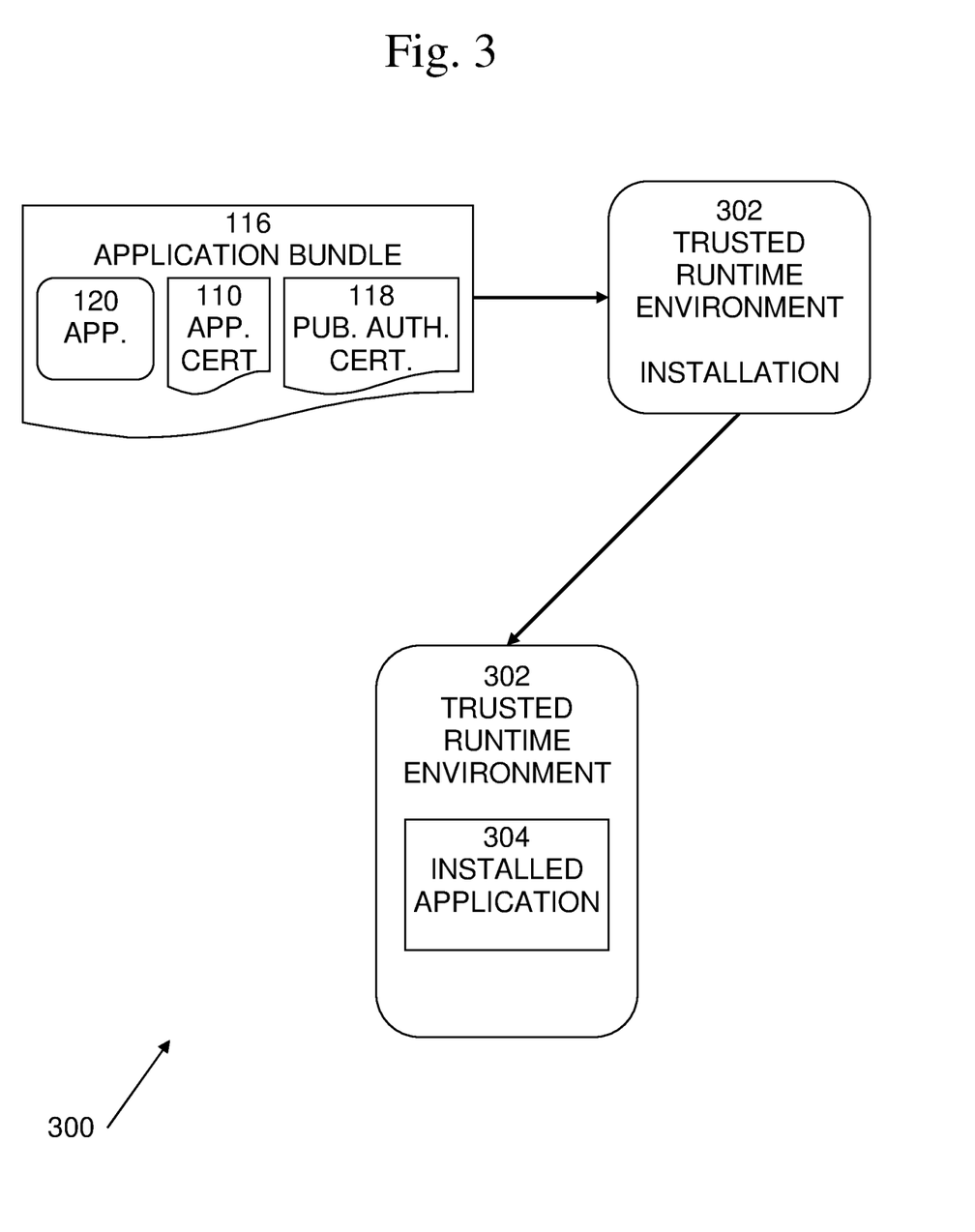
FIG. 3 illustrates an exemplary data flow diagram of application installation process according to embodiments of the present systems and methods.

In embodiments, when the application is deployed, each part of the application that was certified is checked separately—comparing the actual code with the hash contained in the certificate, and if everything matches, it is stored on the device, together with its certified purpose. An exemplary flow diagram of an application installation process 300 is shown in FIG. 3. Process 200 begins with 202, in which application bundle 116, which may include application 120 and application certificate 110, may be sent to trusted runtime environment 302 for installation. Trusted runtime environment 302 may perform the installation process shown in FIG. 4, resulting in installed application 304 present in trusted runtime environment 302.

Figure 4:
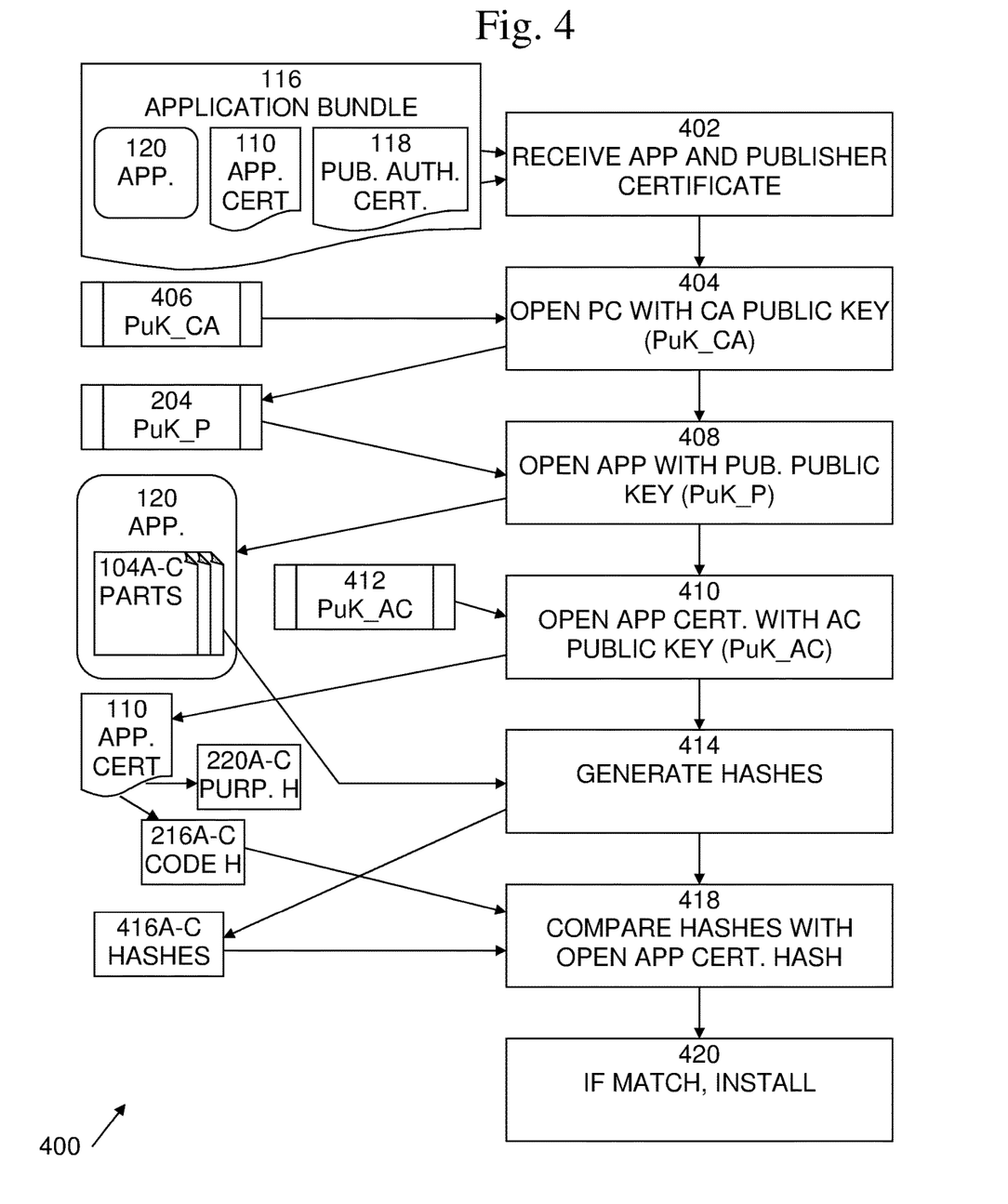
FIG. 4 illustrates an exemplary data flow diagram of application installation process according to embodiments of the present systems and methods.

An exemplary data flow diagram of an application installation process 400 is shown in FIG. 4. It is best viewed in conjunction with FIGS. 2 and 3. Process 400 begins with 402, in which trusted runtime environment 302 may receive application bundle 116, to be installed, and which may include application certificate 110, application 120, and publisher authentication certificate 118. Application 120 may include a plurality of parts 104A-C. At 404, publisher authentication certificate 118 may be verified by opening publisher authentication certificate 118 using a certificate authority public key (PuK_CA) 406 to obtain the publisher's public key (PuK_P) 204.

At 408, publisher's public key (PuK_P) 204 may be used to open application 120 to obtain the application code including application parts 104A-C. At 410, application certificate 110 may be opened using application certifier public key (PuK_AC) 412, to obtain signed purposes 220A-C. At 414, hashes 416A-C of each application part 104A-C may be generated. At 418, generated hashes 416A-C may be compared with signed code hashes 216A-C from open application certificate 110. At 420, if generated hashes 416A-C match signed hashes 216A-C, then application 120, including application parts 104A-C may be installed in trusted runtime environment 302 along with and purposes 220A-C. Each application part 104A-C may be stored separately along with its signed purpose 220A-C.

Figure 5:
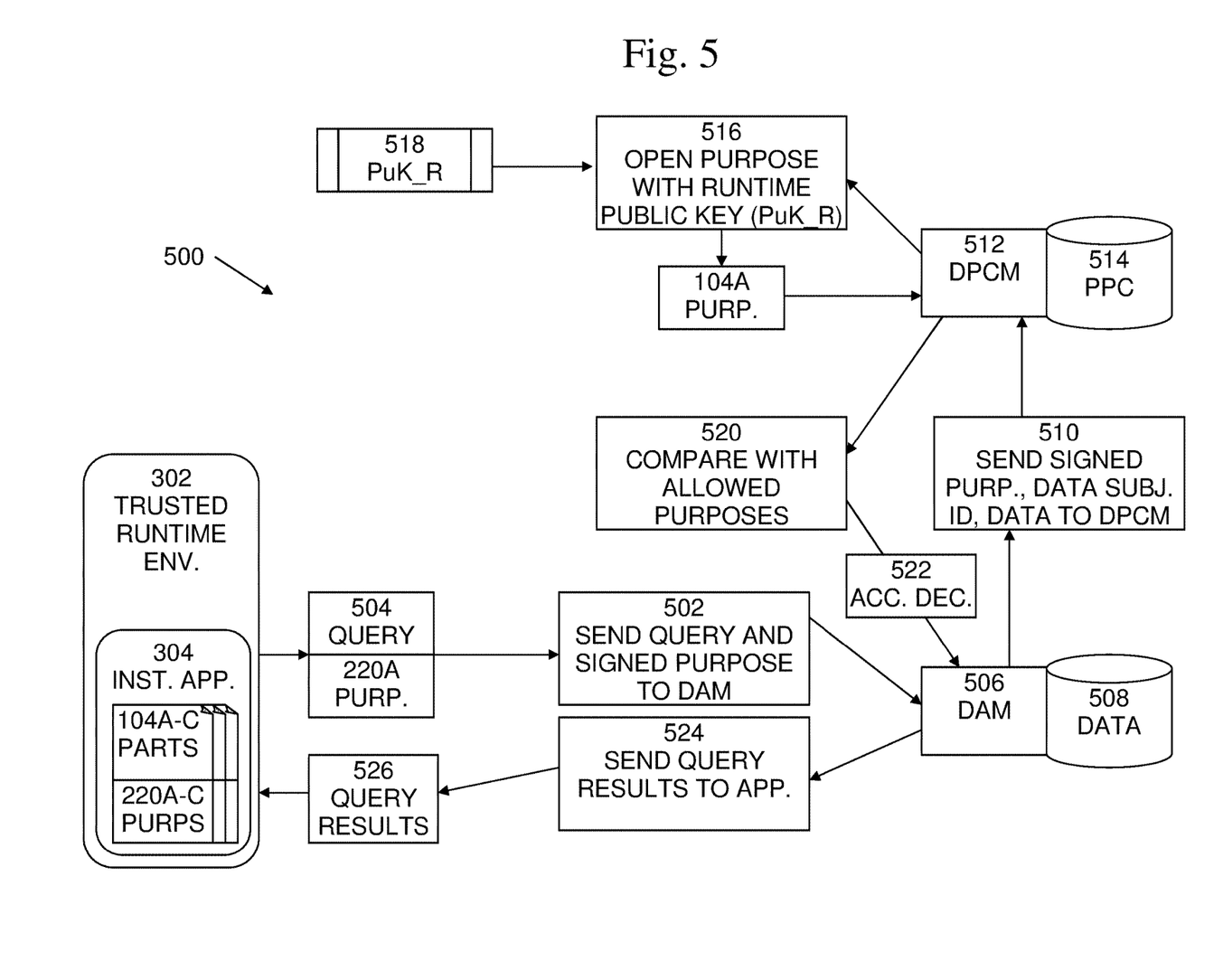
FIG. 5 illustrates an exemplary data flow diagram of application runtime process according to embodiments of the present systems and methods.

An exemplary data flow diagram of an application runtime process 500 is shown in FIG. 5. In this example, each application part 104A-C in installed application 304 may be loaded into memory at a specific location. Process 500 may begin when a particular application part, such as part 104A requests an access to data. At 502, query 504, which may indicate particular data that is requested, and a signed purpose corresponding to the application part that is requesting access, such as signed purpose 220A, may be sent to a data access manager (DAM) 506. DAM 506 may be a system or component that may control access to data/database 508. At 510, DAM 506 may send signed purpose 220A, the data retrieved from data/database 508 that satisfies query 504, and a data subject ID that indicates a subject of the retrieved data, to a data privacy/consent manager (DPCM) 512. DPCM 512 may access purposes, policies, and consent data (PPC) 514 in order to verify requests for access to data.

At 516, DPCM may open signed purpose 220 using runtime public key (PuK_R) 518 to obtain the original purpose, such as purpose 106A. At 520, DPCM 512 may access PPC 514 to obtain the allowed purposes for the data, possibly based on the data subject ID, and may compare the allowed purposes to the requested original purpose 106A. Calls to DPCM 512 may include purpose 106A relevant to the calling code application part 104A. In embodiments, the purpose of the access 220A may be determined based on location in memory of application part 104A. At runtime, whenever the application requests access to personal data, the runtime environment may determine which part of the code made the request and may determine the purpose accordingly, thus enabling a more accurate access decision to be reached.

DPCM may send access decision 522 to DAM 506 based on the comparison results. If the allowed purpose and the requested original purpose 106A match, then access decision 522 may indicate that the requesting application part 104A may be allowed access to the requested data. If the allowed purpose and the requested original purpose 106A do not match, then access decision 522 may indicate that the requesting application part 104A may not be allowed access to the requested data. At 524, if access decision 522 indicates that the requesting application part 104A may be allowed access to the requested data, DAM 506 may send the requested query results 526, which may include the retrieved data satisfying query 504, to the requesting application part 104A.

In embodiments, similar techniques may be used to certify functions, or even specific control flows within an application. For example, Virtual Method Tables or Import Address Tables may be used to determine which method initiated a call. Likewise, a control flow checker may be used in case of control flows.

Figure 6:
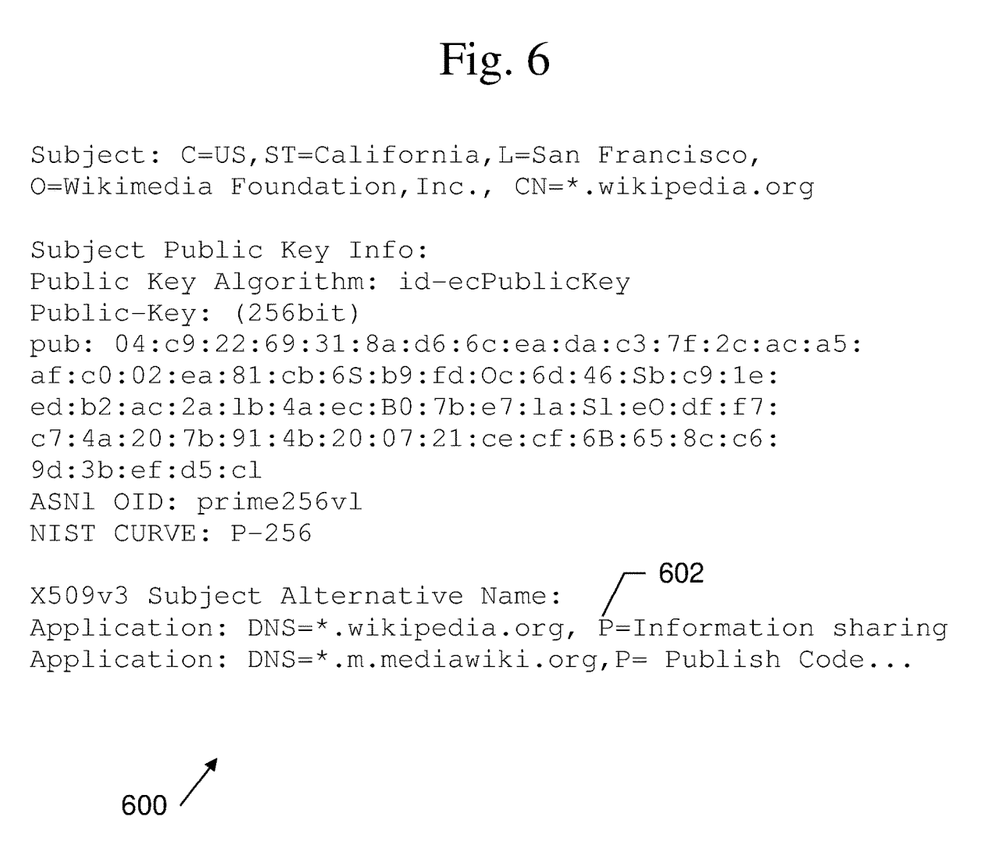
FIG. 6 illustrates exemplary purpose certificate of a Web application according to embodiments of the present systems and methods.

An exemplary embodiment 600, which may be applicable to Web applications, is shown in FIG. 6. In this example, the purpose information 602 may be embedded into a X.509 certificate that is used for the existing TLS handshake. Such embodiments may provide the capability for a browser (or browser extension) to check the purpose of data collection for a certain URL within the Web application and either alert the user to get consent for the data transfer, or automatically match it against some pre-configured user preferences.

Figure 7:
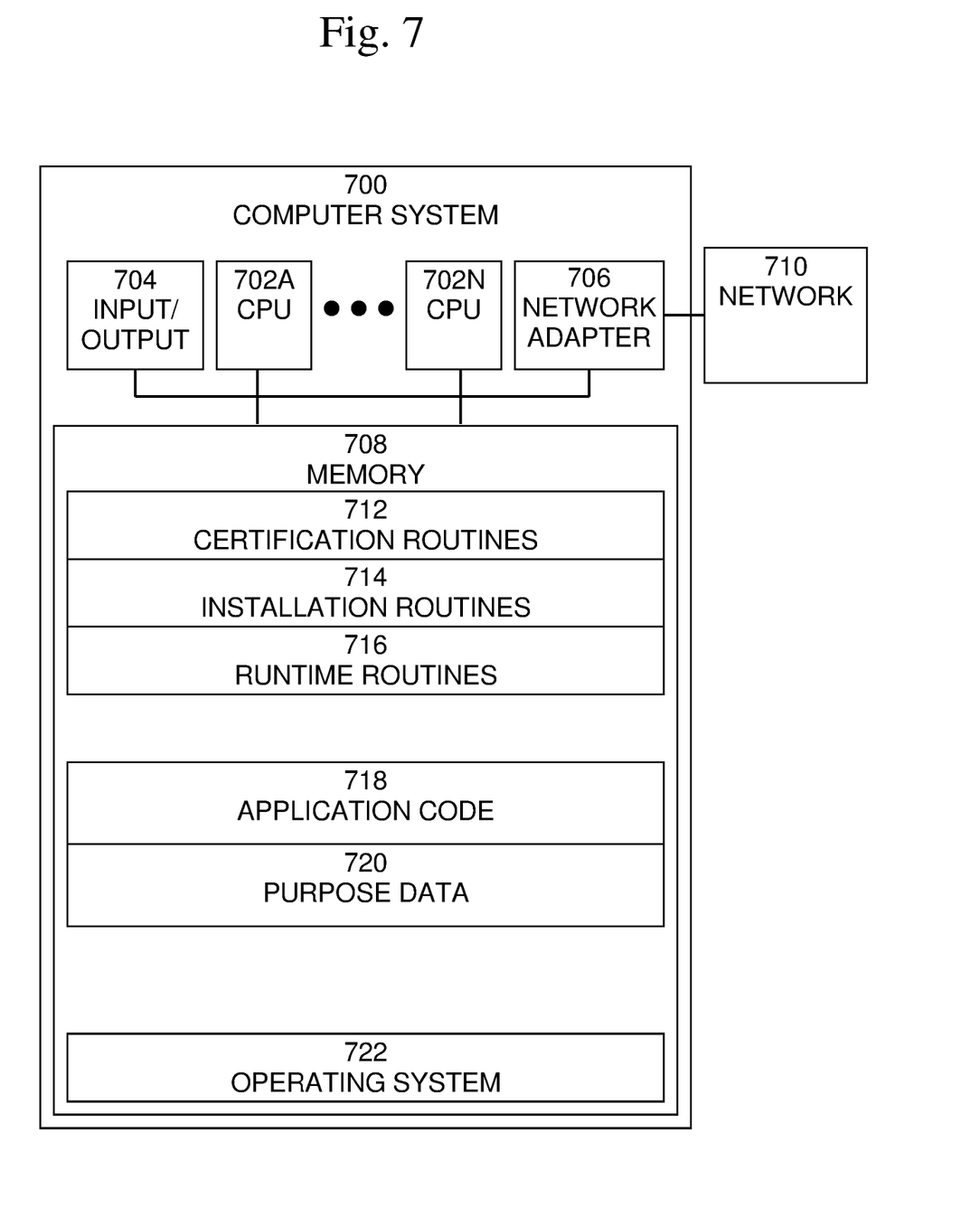
FIG. 7 illustrates an exemplary block diagram of a computer system, in which processes involved in the embodiments described herein may be implemented.

An exemplary block diagram of a computer system 702, in which processes involved in the embodiments described herein may be implemented, is shown in FIG. 7. Computer system 702 may be implemented using one or more programmed general-purpose computer systems, such as embedded processors, systems on a chip, personal computers, workstations, server systems, and minicomputers or mainframe computers, or in distributed, networked computing environments. Computer system 702 may include one or more processors (CPUs) 702A-702N, input/output circuitry 704, network adapter 706, and memory 708. CPUs 702A-702N execute program instructions in order to carry out the functions of the present communications systems and methods. Typically, CPUs 702A-702N are one or more microprocessors, such as an INTEL CORE® processor. FIG. 7 illustrates an embodiment in which computer system 702 is implemented as a single multi-processor computer system, in which multiple processors 702A-702N share system resources, such as memory 708, input/output circuitry 704, and network adapter 706. However, the present communications systems and methods also include embodiments in which computer system 702 is implemented as a plurality of networked computer systems, which may be single-processor computer systems, multi-processor computer systems, or a mix thereof.

Input/output circuitry 704 provides the capability to input data to, or output data from, computer system 702. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 702. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 may vary depending upon the function that computer system 702 is programmed to perform. In the example shown in FIG. 7, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 7 may be implemented on a current leader server. Likewise, in embodiments, at least a portion of the software shown in FIG. 7 may be implemented on a computer system other than the current leader server.

In the example shown in FIG. 7, memory 708 may include certification routines 712, installation routines 714, runtime routines 716, application code 718, purpose data 720, and operating system 722. Certification routines 712 may include software routines to perform certification processing as described above. Installation routines 714 may include software routines to perform installation processing, as described above. Runtime routines 716 may include software routines to perform runtime processing, as described above. Application code 718 may include software code for which data access control is implemented using certification routines 712, installation routines 714, runtime routines 716, and purpose data 720, as described above. Operating system 722 may provide overall system functionality.

As shown in FIG. 7, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for controlling application access to data implemented in a computer comprising a processor, memory accessible by the processor, and computer program instructions stored in the memory and executable by the processor, the method comprising:
    receiving an application comprising a plurality of application parts, each application part associated with only one declared data access purpose; and
    generating a cryptographic certificate for each application part to be certified by determining whether a declared data access purpose for each application part to be certified is correct and the only one data access purpose for that part, wherein the only one declared purpose is included in purpose information associated with each application part to be certified.

2. The method of claim 1, wherein the application parts comprise at least one of an area, module, section, portion, function, address, uniform resource locator (URL), or control flow of an application.

3. The method of claim 1, further comprising
    generating a hash of program application code of each application part to be certified; and
    signing the generated hash and signing data access purpose with a private cryptographic key to form the cryptographic certificate.

4. The method of claim 1, further comprising
    receiving an application wherein each of a plurality of application parts has been certified with a data usage purpose;
    executing the program application code; and
    when a certified application part requests access to data, determining whether to allow access to the requested data based on the certified data usage purpose and on the identity of the application part.

5. The method of claim 4, wherein determining whether to allow access to the requested data comprises:
    sending a request for data from an application part and associated signed purpose information;
    receiving a response to the request for data generated by:
    retrieving data responsive to the request for data;
    retrieving the requested purpose from the signed purpose information;
    determining whether the retrieved data is allowed for the requested purpose; and
    including the retrieved data responsive to the request in the response to the request when the retrieved data is allowed for the requested purpose.

6. The method of claim 1, further comprising:
    installing the received program application code by:
    verifying a cryptographic certificate for each application part to be installed; and
    installing the verified application parts.

7. The method of claim 6, wherein verifying the cryptographic certificate comprises:
    generating a hash of program application code of each application part to be installed;
    opening the cryptographic certificate using a public key to obtain the corresponding hash of each application part to be installed;
    comparing the generated hash with the corresponding hash; and when the generated hash matches the corresponding hash, installing that application part along with signed purpose information associated with that application part.

8. A system for controlling application access to data, the system comprising a processor, memory accessible by the processor, and computer program instructions stored in the memory and executable by the processor to perform:
   receiving an application comprising a plurality of application parts, each application part associated with only one declared data access purpose; and
   generating a cryptographic certificate for each application part to be certified by determining whether a declared data access purpose for each application part to be certified is correct and the only one data access purpose for that part, wherein the only one declared purpose is included in purpose information associated with each application part to be certified.

9. The system of claim 8, wherein the application parts comprise at least one of an area, module, section, portion, function, address, uniform resource locator (URL), or control flow of an application.

10. The system of claim 8, further comprising
    generating a hash of program application code of each application part to be certified; and
    signing the generated hash and signing data access purpose with a private cryptographic key to form the cryptographic certificate.

11. The system of claim 8, further comprising
    receiving an application wherein each of a plurality of application parts has been certified with a data usage purpose;
    executing the program application code; and
    when a certified application part requests access to data, determining whether to allow access to the requested data based on the certified data usage purpose and on the identity of the application part.

12. The system of claim 11, wherein determining whether to allow access to the requested data comprises:
    sending a request for data from an application part and associated signed purpose information;
    receiving a response to the request for data generated by:
    retrieving data responsive to the request for data;
    retrieving the requested purpose from the signed purpose information;
    determining whether the retrieved data is allowed for the requested purpose; and
    including the retrieved data responsive to the request in the response to the request when the retrieved data is allowed for the requested purpose.

13. The system of claim 8, further comprising:
    installing the received program application code by:
    verifying a cryptographic certificate for each application part to be installed; and
    installing the verified application parts.

14. The system of claim 13, wherein verifying the cryptographic certificate comprises:
    generating a hash of program application code of each application part to be installed;
    opening the cryptographic certificate using a public key to obtain the corresponding hash of each application part to be installed;
    comparing the generated hash with the corresponding hash; and
    when the generated hash matches the corresponding hash, installing that application part along with signed purpose information associated with that application part.

15. A computer program product for controlling application access to data, the computer program product comprising a non-transitory computer readable storage having program instructions embodied therewith, the program instructions executable by a computer, to cause the computer to perform a method comprising:
    receiving an application comprising a plurality of application parts, each application part associated with only one declared data access purpose; and
    generating a cryptographic certificate for each application part to be certified by determining whether a declared data access purpose for each application part to be certified is correct and the only one data access purpose for that part, wherein the only one declared purpose is included in purpose information associated with each application part to be certified.

16. The computer program product of claim 15, wherein the application parts comprise at least one of an area, module, section, portion, function, address, uniform resource locator (URL), or control flow of an application.

17. The computer program product of claim 15, further comprising
    generating a hash of program application code of each application part to be certified; and
    signing the generated hash and signing data access purpose with a private cryptographic key to form the cryptographic certificate.

18. The computer program product of claim 15, further comprising
    receiving an application wherein each of a plurality of application parts has been certified with a data usage purpose;
    executing the program application code; and
    when a certified application part requests access to data, determining whether to allow access to the requested data based on the certified data usage purpose and on the identity of the application part.

19. The computer program product of claim 18, wherein determining whether to allow access to the requested data comprises:
    sending a request for data from an application part and associated signed purpose information;
    receiving a response to the request for data generated by:
    retrieving data responsive to the request for data;
    retrieving the requested purpose from the signed purpose information;
    determining whether the retrieved data is allowed for the requested purpose; and
    including the retrieved data responsive to the request in the response to the request when the retrieved data is allowed for the requested purpose.

20. The computer program product of claim 15, further comprising:
    installing the received program application code by:
    verifying a cryptographic certificate for each application part to be installed; and
    installing the verified application parts;
    wherein verifying the cryptographic certificate comprises:
    generating a hash of program application code of each application part to be installed;
    opening the cryptographic certificate using a public key to obtain the corresponding hash of each application part to be installed;
    comparing the generated hash with the corresponding hash; and when the generated hash matches the corresponding hash, installing that application part along with signed purpose information associated with that application part.

* * * * *